US009946550B2

(12) United States Patent
Rangan et al.

(10) Patent No.: US 9,946,550 B2
(45) Date of Patent: Apr. 17, 2018

(54) TECHNIQUES FOR PREDICATED EXECUTION IN AN OUT-OF-ORDER PROCESSOR

(75) Inventors: Ram Rangan, Austin, TX (US); William E. Speight, Austin, TX (US); Mark W. Stephenson, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/856,170

(22) Filed: Sep. 17, 2007

(65) Prior Publication Data

US 2009/0077354 A1 Mar. 19, 2009

(51) Int. Cl.
*G06F 9/30* (2006.01)
*G06F 9/38* (2018.01)

(52) U.S. Cl.
CPC ........ *G06F 9/3851* (2013.01); *G06F 9/30072* (2013.01); *G06F 9/30076* (2013.01); *G06F 9/30087* (2013.01); *G06F 9/30094* (2013.01); *G06F 9/384* (2013.01)

(58) Field of Classification Search
USPC ....................................................... 712/226
See application file for complete search history.

(56) References Cited

U.S. PATENT DOCUMENTS

| 6,442,679 B1 | 8/2002 | Klauser et al. |
|---|---|---|
| 6,513,109 B1 | 1/2003 | Gschwind et al. |
| 6,883,089 B2 | 4/2005 | Kling et al. |
| 7,085,919 B2 | 8/2006 | Grochowski et al. |
| 7,178,011 B2 | 2/2007 | Seal et al. |
| 2004/0250051 A1 | 12/2004 | Seal et al. |

FOREIGN PATENT DOCUMENTS

| JP | H02-087229 A | 3/1990 |
|---|---|---|
| JP | 10-283185 A | 10/1998 |
| JP | 2001-175473 A | 6/2001 |
| JP | 2006-079623 A | 3/2006 |
| JP | 2006-526813 A | 11/2006 |

OTHER PUBLICATIONS

Wang et al.; Register Renaming and Scheduling for Dynamic Execution of Predicated Code; 2001; IEEE.*
Sohi et al.; Guarded Execution and Branch Prediction in Dynamic ILP Processors; 1994; IEEE.*
Chuang, W. et al. "Predicate Prediction for Efficient Out-of-order Execution", *Proceedings of the 17th Annual International Conference on Supercomputing*, (San Francisco, CA, USA, Jun. 23-26, 2003). ICS '03. ACM Press, New York, NY, 183-192.
Quiñones, E. et al. "Selective predicate prediction for out-of-order processors." *Proceedings of the 20th Annual international Conference on Supercomputing*, (Cairns, Queensland, Australia, Jun. 28-Jul. 1, 2006). ICS '06. ACM Press, New York, NY, 46-54.

* cited by examiner

*Primary Examiner* — Corey S Faherty
(74) *Attorney, Agent, or Firm* — Yudell Isidore PLLC

(57) ABSTRACT

A technique for handling predicated code in an out-of-order processor includes detecting a predicate defining instruction associated with a predicated code region. Renaming of predicated instructions, within the predicated code region, is then stalled until a predicate of the predicate defining instruction is resolved.

16 Claims, 3 Drawing Sheets ns (US 9,946,550 B2)

TECHNIQUES FOR PREDICATED EXECUTION IN AN OUT-OF-ORDER PROCESSOR

BACKGROUND

Field

This disclosure relates generally to predicated execution and, more specifically to techniques for predicated execution in an out-of-order processor.

Related Art

Today, branch instructions are considered a major impediment to exploiting instruction level parallelism (ILP), which is a measure of how many operations in a computer program (program) can be performed simultaneously. In general, compilers and hardware are required to make frequent accurate branch predictions in order to achieve adequate ILP. Branch misprediction typically results in performance degradation, due to wasted cycles that are introduced into an instruction stream. Branch misprediction in superscalar and very long instruction word (VLIW) processors degrades performance even more than branch misprediction in scalar processors in that each wasted cycle may reduce throughput by multiple instructions.

Predicated execution, which refers to conditional execution of an instruction based on a value of a boolean source operand (known as a predicate of the instruction), provides a technique to eliminate branches from an instruction stream. In a typical implementation, a compiler employing predicated execution uses an if-conversion algorithm to convert conditional branches into predicate defining instructions and instruction streams along alternate paths into predicated instructions. In a typical case, predicated instructions are fetched irrespective of their predicate value. An instruction with a true predicate is executed normally, while an instruction with a false predicate is nullified such that the nullified instruction is prevented from modifying a processor state. In general, predicated execution allows a compiler to provide ILP to the hardware along multiple execution paths, albeit at lower instruction fetch efficiency.

Out-of-order execution allows instructions to execute in any order that does not violate data dependencies. Out-of-order execution may or may not be employed in conjunction with pipelining and superscalar techniques. Out-of-order execution is employed in many high-performance processors to utilize processor cycles that would otherwise not be utilized. The primary focus of out-of-order execution is to allow a processor to avoid stalls that occur when data needed to perform an operation is not available. In an out-of-order processor, instructions are handled in data order, i.e., in the order in which data operands become available in a register of the processor. Out-of-order processors fill slots in time when data is not available for associated instructions with other instructions that are ready to execute. An out-of-order processor then re-orders results, before committing instructions executed out-of-order to architectural state, such that it appears that the instructions were processed in program order, i.e., the order of the instructions in an original program.

To successfully reorder instructions, modern out-of-order processors employ a technique called renaming. Renaming involves assigning unique physical locations to each result register generated by an instruction. Implementations typically use reservation stations, register update units (RUUs), physical register files, etc. An out-of-order processor tracks the availability of a result operand of a producing instruction and specifies (to a dependent consumer instruction) a unique physical location from which to obtain the result operand. Predication may introduce multiple producer instructions to the same architectural register, each of which gets renamed to a unique physical location in an out-of-order processor. As a result, an out-of-order processor may not be able to uniquely identify (to a waiting consumer instruction) an exact location of a source operand. Consequently, in the absence of explicit support to handle such situations, an out-of-order processor has stalled until all in-flight producer instructions have completed, which results in inefficient performance. Processors that employ predicate prediction have been disclosed in a number of U.S. patents (see, for example, U.S. Pat. Nos. 7,085,919; 6,513,109; and 6,442,679).

SUMMARY

According to various aspects of the present disclosure, a technique for handling predicated code in an out-of-order processor includes detecting a predicate defining instruction associated with a predicated code region. Renaming of predicated instructions, within the predicated code region, is then stalled until a predicate of the predicate defining instruction is resolved.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
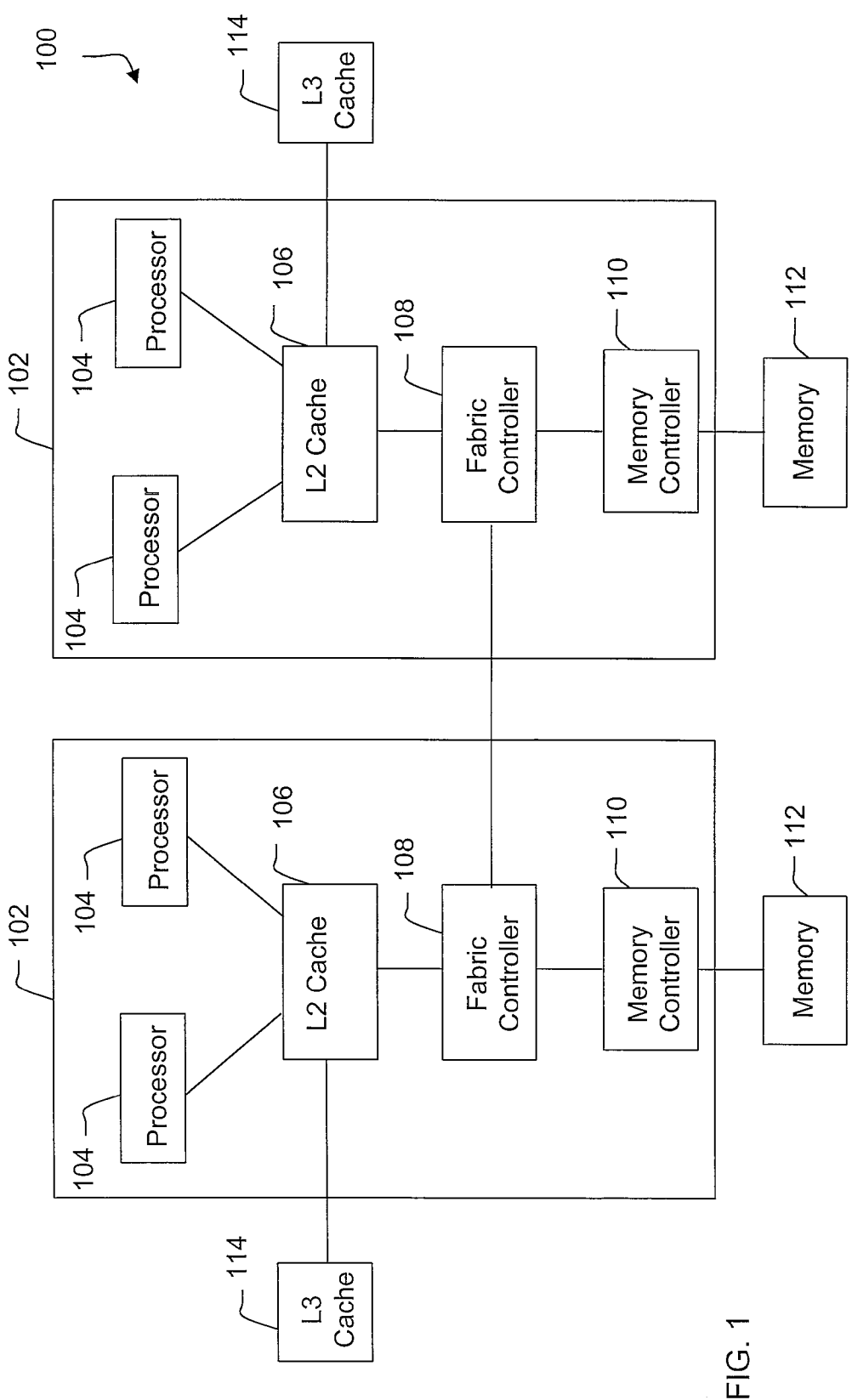
FIG. 1 is a block diagram of an example processor system that may be configured according to various aspects of the present disclosure.

As will be appreciated by one of ordinary skill in the art, the present invention may be embodied as a method, system, device, or computer program product stored on a computer-readable storage medium. Accordingly, the present invention may take the form of an entirely hardware embodiment, an entirely software embodiment (including firmware, resident software, micro-code, etc. stored on a computer-readable storage medium) or an embodiment combining software and hardware aspects that may all generally be referred to herein as a "circuit," "module" or "system." The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Various techniques may be used to predict a predicate value before operand renaming. In this case, predicted-taken path instructions are processed normally, while the predicted-not-taken path instructions are held in a processor buffer. Upon actual resolution of the predicate value, if the predicate prediction is found to be correct, no extra action is taken and instructions from the predicted-not-taken path held in the processor buffer are discarded. If the prediction is found to be incorrect, all predicted-taken instructions and any subsequent instructions dispatched are discarded (i.e. the predicted-taken instructions and any subsequent instructions are not allowed to update architectural state). Routine processing then resumes with the predicted-not-taken instructions held in the processor buffer. In at least some implementations, logic may be employed to avoid having to refetch instructions after a predicated code region.

In general, accurate specification of a location, i.e., from a register file or bypass logic, from which a consumer instruction should obtain its operands is necessary for correct operation of a processor. Moreover, out-of-order execution generally requires a technique that clearly identifies a producer of a register operand to wake-up any instruction that is waiting to consume the operand. Unfortunately, predication introduces conditional writers and, as such, obfuscates the wake-up process and bypass logic in out-of-order processors. According to various aspects of the present disclosure, processing of a predicated code region (including predicated instructions associated with a taken path and a not taken path) is stalled until a corresponding predicate or predicates is/are resolved. Upon resolution of the predicate or predicates, register renaming is performed on predicated instructions associated with a correct path (i.e., a taken path) and predicated instructions associated with an incorrect path (i.e., a not taken path) are discarded.

The techniques disclosed herein may be implemented by adding a data path between an execute stage of a branch pipeline and a register rename stage of the branch pipeline. In general, the register rename stage is modified to recognize predicated code regions, receive a resolved predicate from the execute stage of the branch pipeline, and discard predicated instructions associated with a not taken path. As used herein, a predicate defining instruction includes an instruction that sets a value of a predicate, upon which execution of subsequent instructions (included in a predicated code region) may be predicated. For example, in instruction set architectures (ISAS) with explicit predication support, such as the Intel IA-64 architecture, comparison instructions are predicate defining instructions.

According to one aspect of the present disclosure, a technique for handling predicated code in an out-of-order processor includes detecting a predicate defining instruction associated with a predicated code region. Renaming of predicated instructions, within the predicated code region, is then stalled until a predicate of the predicate defining instruction is resolved.

According to another aspect of the present disclosure, an out-of-order processor includes a decoder and a pipeline stage. The decoder is configured to decode a predicate defining instruction associated with a predicated code region, which includes predicated instructions. The pipeline stage is configured to detect the predicate defining instruction and stall renaming of the predicated instructions until a predicate of the predicate defining instruction is resolved. The pipeline stage may also be configured to discard the predicated instructions that are associated with a not taken path or convert the predicated instructions that are associated with the not taken path to no-operation (nop) instructions that do not alter architectural state upon resolution of the predicate.

According to one embodiment of the present disclosure, a processor system includes a memory subsystem and an out-of-order processor, which includes a decoder and a pipeline stage, coupled to the memory subsystem. The decoder is configured to decode a predicate defining instruction associated with a predicated code region, which includes predicated instructions. The pipeline stage is configured to detect the predicate defining instruction and stall renaming of the predicated instructions until a predicate of the predicate defining instruction is resolved. The pipeline stage may also be configured to discard the predicated instructions that are associated with a not taken path or convert the predicated instructions that are associated with the not taken path to no-operation (nop) instructions that do not alter architectural state upon resolution of the predicate.

The techniques disclosed herein are equally applicable to ISAs with explicit predication support, as well as architectures with implicit predication support (such as the ARM Thumb architecture). As one example, an existing ISA may be augmented with a predicate defining instruction (e.g., an emask instruction), which is similar to an if-then instruction of the Thumb architecture (see, for example, U.S. Pat. No. 7,178,011). Example pseudo code that does not include predication is set forth below:

```
isequal cr7, 0, r10
branch cr7, ELSE
sub r1=r1, r2
load r4=[r1]
jump MERGE
ELSE: add r1=r1, r2
load r3=[r1]
add r5=r3, r4
MERGE: store r5, [r1]
```

The pseudo code set forth above may be replaced with the following predicated code:

```
isequal cr7, 0, r10
emask cr7, 11001b, 5
add r1=r1, r2
load r3=[r1]
sub r1=r1, r2
load r4=[r1]
add r5=r3, r4
MERGE: store r5, [r1]
```

In the above predicated code, the emask instruction is responsible for providing predication semantics. In particular, the emask instruction specifies an execution mask that should control the execution of the five following instructions (included within a predicated code region) with the first, second and fifth predicated instructions belonging to a first path and the third and fourth predicated instructions belonging to a second path. Depending on a predicate value (condition register 7 (cr7)) returned, either the first or second path predicated instructions are executed and, conversely, either the second or the first path predicated instructions are discarded or turned into no-operation (nop) instructions.

With reference to FIG. 1, an example processor system 100 is illustrated that includes two chip-level multiprocessors (CMPs) 102, each of which includes two processors 104. In at least one embodiment, the processors 104 each include a first level (L1) cache memory (not separately shown) that is coupled to a shared second level (L2) cache memory (cache) 106, which is coupled to a third level (L3) cache 114 and a fabric controller 108. The fabric controller 108 is coupled to a memory controller 110, which is coupled to a memory subsystem 112. The memory subsystem 112 includes an application appropriate amount of volatile and non-volatile memory. The fabric controller 108 facilitates communication between different ones of the CMPs 102 and between the processors 104 and the memory subsystem 112 and in this manner functions as an interface.

Figure 2:
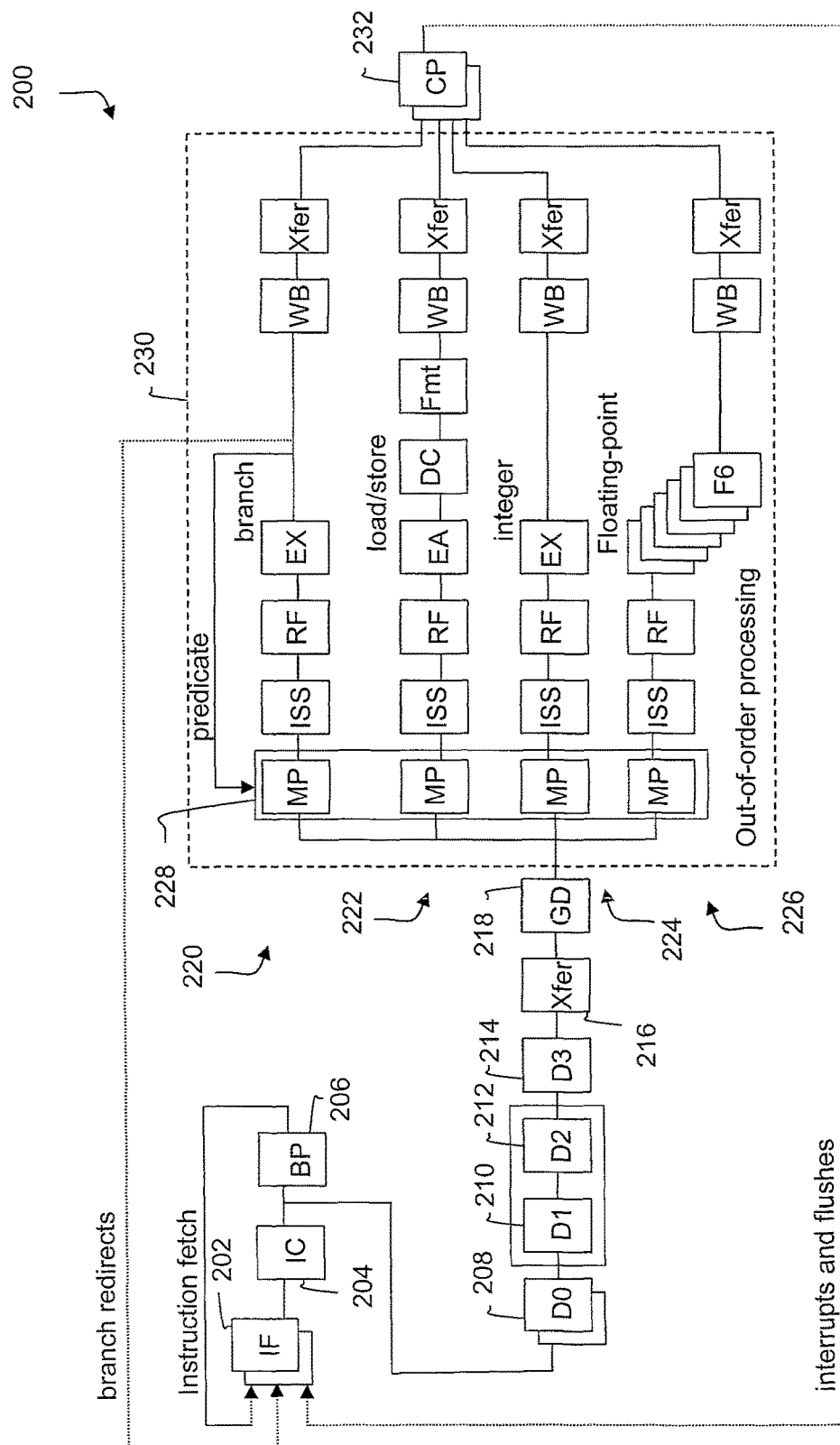
FIG. 2 is a block diagram of an example processor instruction pipeline that may be employed in a processor of the processor system of FIG. 1, according to various embodiments of the present disclosure.

With reference to FIG. 2 an example instruction pipeline 200 of one of the processors 104, configured according to the present disclosure, is illustrated. The processor 104 may, for example, operate in a simultaneous multithreading (SMT) mode or a single thread (ST) mode. When the processor 104 is operating in the SMT mode, the processor 104 may employ multiple separate instruction fetch address registers to store program counters for multiple threads. In this case, instruction fetches, in an instruction fetch (IF) stage 202, alternate between the multiple threads. In the ST mode, the processor 104 typically only employs one program counter and fetches instructions for a single thread each processor cycle. In one embodiment, the processor 104 may be configured to fetch (in an instruction cache (IC) stage 204) up to eight instructions each processor cycle from an instruction cache. In the SMT mode, the multiple (e.g., two) threads may share the instruction cache and instruction translation facilities.

In a given processor cycle, all fetched instructions are typically associated with the same thread. In one embodiment, the processor 104 scans fetched instructions for branches, in a branch predict (BP) stage 206. If a branch is detected in the BP stage 206, the processor 104 may predict the branch direction using, for example, three branch history tables (BHTs) shared by the two threads. In one embodiment, two of the BHTs use bimodal and path-correlated branch prediction mechanisms to predict branch directions. A third BHT may be configured to predict which of the prediction mechanisms are more likely to predict the correct direction. If the fetched instructions contain multiple branches, the BP stage 206 may be configured to predict all the branches at the same time. In addition to predicting branch direction, the BP stage 206 may also be configured to predict a target of a taken branch in a current instruction group cycle. The processor 104 may employ a return stack, e.g., one for each thread, for predicting a target of a subroutine return.

The processor 104 may employ a shared target cache for predicting the target of other branches. If there is a taken branch, the processor 104 may be configured to load the program counter with a target address of the branch. If there is not a taken branch, the processor 104 may be configured to load the program counter with an address of a next sequential instruction. The processor 104 may be configured to place fetched instructions in a predicted path in separate instruction fetch queues for the multiple threads in a first decode (D0) stage 208. On the basis of thread priorities, the processor 104 is configured to select instructions from one of the instruction fetch queues and form a group in decode stage D1 210, decode stage D2 212, and decode stage D3 214. Logic for identifying a predicated instruction may, for example, be employed in the decode stage D1 210 and the decode stage D2 212. In one embodiment, all instructions in a group come from the same thread and are decoded in parallel. The processor 104 queues instruction in a queue (in transfer (Xfer) stage 216) until resources are available such that a group of instructions can be dispatched.

In one embodiment, each dispatched instruction group corresponds to an entry in a global completion table (GCT) and each instruction in the group corresponds to an entry in an appropriate issue queue. Each load and store instruction occupies an entry in a load reorder queue and a store reorder queue, respectively, to detect out-of-order execution hazards. When all the resources necessary for dispatch are available for an instruction group, the instruction group is dispatched in a group dispatch (GD) stage 218. Instructions flow through the pipeline stages between the IF stage 202 and the GD stage 218 in program order. After dispatch, each instruction flows through a renaming stage (or a mapping (MP) stage) 228, which maps logical register numbers in an instruction to physical registers.

According to various aspects of the present disclosure, register renaming for predicated instructions is stalled in the MP stage 228 until a predicate associated with a predicate defining instruction is resolved (i.e., until the predicate defining instruction is executed and the predicate is resolved). In one embodiment, the MP stage 228 employs a mask shift register (not separately shown) that stores a mask associated with the predicate defining instruction. When the predicate is resolved and returned to the MP stage 228, a logical function (e.g., an exclusive NOR) is performed on the predicate and the mask to determine which of the predicated instruction should be executed. Register renaming is performed for the predicated instructions that are to be executed (i.e., the predicated instructions along a taken path) and predicated instructions that are not to be executed (i.e., the predicated instructions along a not taken path) are discarded.

In one embodiment, the processor 104 implements one-hundred twenty physical general purpose registers (GPRs) and one-hundred twenty physical floating-point registers (FPRs). When multiple threads are executed, the processor 104 may be configured such that the multiple threads dynamically share register files. To facilitate out-of-order processing in the ST mode, the processor 104 may be configured to make all physical registers available to a single thread to facilitate higher instruction-level parallelism. After register renaming, instructions enter issue queues shared by the multiple threads. The processor 104 may employ multiple issue queues. A floating-point issue queue may be employed to feed one or more floating-point pipelines (execution units) 226, a branch issue queue may be employed to feed a branch pipeline (execution unit) 220, a condition register logical queue may be employed to feed a condition register logical operation pipeline (execution unit) (not shown), and a combined issue queue may be employed to feed one or more fixed-point (integer) pipelines (execution units) 224 and one or more load-store pipelines (execution units) 222. In one embodiment, the processor 104 includes eight execution units (not all of which are shown in FIG. 2), each of which can execute an instruction each cycle.

To simplify the logic for tracking instructions through the pipelines 220-226, the processor 104 may be configured to track instructions as a group. In this case, each group of dispatched instructions occupies an entry in the GCT at the time of dispatch. In this case, an entry is deallocated from the GCT when the group is committed. Although the entries in the GCT are in program order and from a given thread, successive entries can belong to different threads. When all input operands for an instruction are available, it becomes eligible for issue. Among the eligible instructions in the issue queue, the issue logic selects one and issues it for execution in the issue (ISS) stage. For instruction issue, there is usually no distinction between instructions from the two threads.

When issued, the instruction reads one or more associated input physical registers in a register file (RF) stage, executes in an execute (EX) stage, and writes a result back to an associated output physical register in a write-back (WB) stage. In one embodiment, each floating-point pipeline 226 has a six-cycle execution pipe (F1 through F6 stages). In each load-store pipeline 222, an adder computes the address to read or write in a compute address (EA) stage, and a data cache is accessed in a data cache (DC) stage. For load instructions, once data is returned, a formatter selects the correct bytes from the cache line in a format (Fmt) stage and then writes data to the register in the WB stage. When all the instructions in a group have executed (without generating an exception) and the group is the oldest group of a given thread, the group is committed to architectural state in a completion (CP) stage 232. In one embodiment, two instruction groups can commit per cycle, i.e., one from each of two threads. In one embodiment, the processor 104 includes L1 instruction and data caches (not separately shown) of 64 Kbytes and 32 Kbytes, respectively (having two-way and four-way associativity, respectively). In an embodiment, a first-level data translation table (not separately shown) is fully associative and includes 128 entries.

Figure 3:
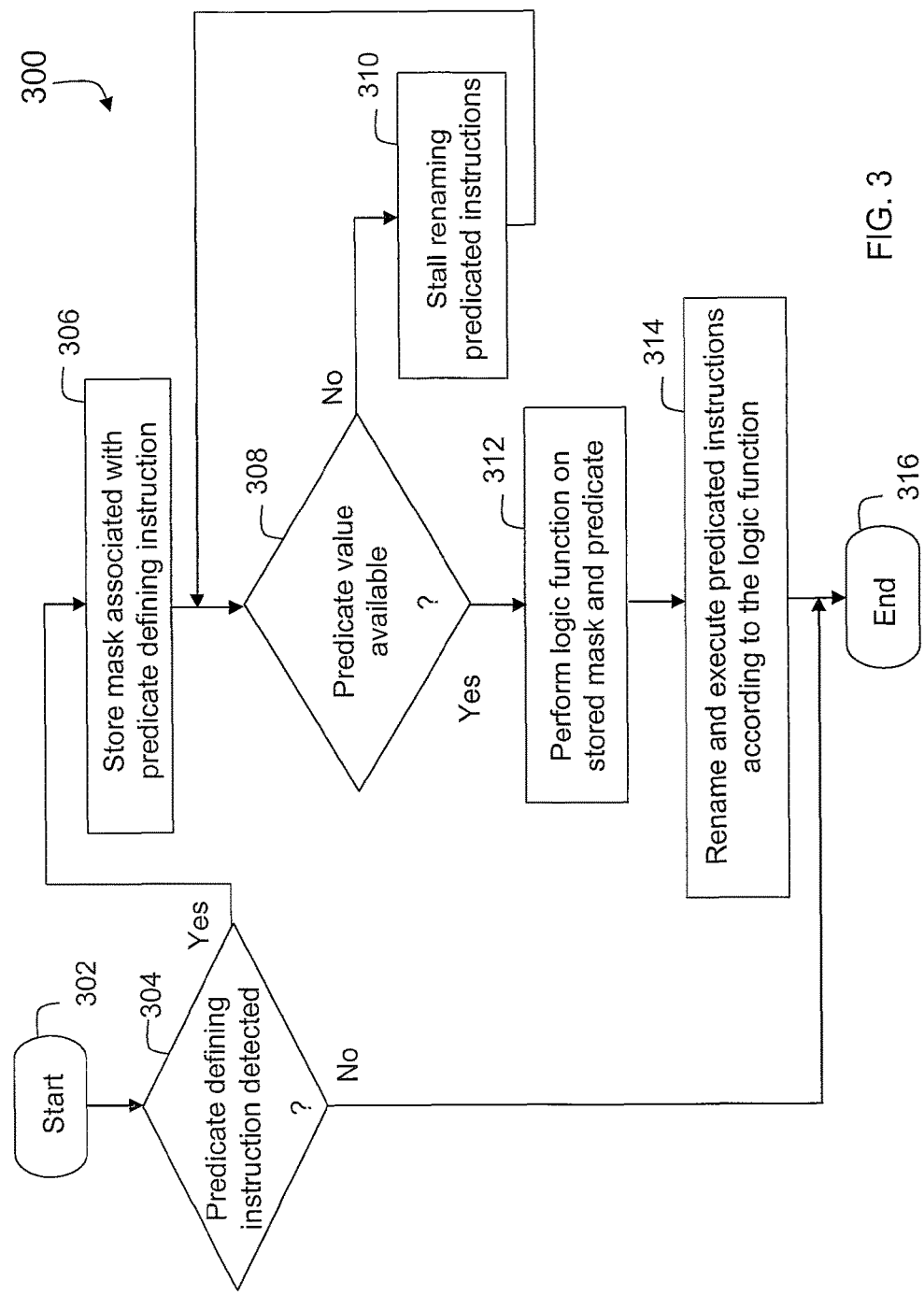
FIG. 3 is a flowchart of an example process employed in the example processor instruction pipeline of FIG. 2.

Moving to FIG. 3, an example process 300 for handling predicated code in an out-of-order processor, according to various aspects of the present disclosure, is illustrated. In block 302, the process 300 is initiated at which point control transfers to decision block 304. In block 304, if a predicate defining instruction (which corresponds to a known operational code (opcode)) is not detected, for example, in the MP stage 228 of the processor pipeline 200, control transfers to block 316. In block 304, if a predicate defining instruction is detected, control transfers to block 306. In block 306, a mask associated with the predicate defining instruction is stored in a mask shift register (included in, for example, the MP stage 228) for later use. The mask indicates which of two alternate paths (i.e., a taken path or a not taken path) each of the predicated instructions belongs. Then, in decision block 308, it is determined whether a predicate value associated with the predicate defining instruction is available.

As is illustrated in FIG. 2, the predicate is fed back from an output of the EX stage of the branch pipeline 220 to the MP stage 228. If the predicate of the predicate defining instruction is not available in block 308, control transfers to block 310, where predicated instruction renaming is stalled. Following block 310, control transfers to block 308. When the predicate of the predicate defining instruction is available in block 308, control transfers to block 312. As noted above, the result (i.e., the condition register value) of executing the predicate defining instruction is fed back from that the output of the EX stage of the branch pipeline 220 to the MP (rename) stage 228. In block 312, a logic function (e.g., an exclusive NOR function) is performed on the mask and the predicate to determine which of the following predicated instructions are to be renamed and executed and which of the predicated instructions are to be discarded or converted to nop instructions. Next, in block 314, predicated instructions that are suppose to be renamed (according to the logic function) are renamed and predicated instructions that are not suppose to be renamed (according to the logic function) are discarded or converted into nop instructions. The renamed instructions may then be executed. Following block 314, control transfers to block 316 where the process 300 terminates until a next predicate defining instruction is detected.

The techniques disclosed herein can be implemented with minimal modifications to a processor core and an associated instruction set architecture. Accordingly, techniques have been disclosed herein that facilitate efficient handling of predicated code in an out-of-order processor.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of handling predicated code in an out-of-order processor, the method comprising:

recognizing a predicate defining instruction within a renaming stage of a branch pipeline of the out-of-order processor, wherein the predicate defining instruction is associated with a predicated code region, and wherein the out-of-order processor comprises a plurality of pipelines comprising at least: the branch pipeline, one or more load-storage pipelines, one or more fixed-point pipelines, one or more floating point pipelines, and a condition register logical operation pipeline;

decoding the predicate defining instruction, wherein the predicate defining instruction includes an instruction that when executed sets a result including a predicate value of a predicate on which one or more subsequent instructions is predicated;

decoding a plurality of predicated instructions included within the predicated code region;

in response to detecting a predicate defining instruction within the renaming stage, storing a mask associated with the predicate defining instruction in a mask shift register of the renaming stage of the branch pipeline, wherein the mask indicates whether each instruction of the plurality of predicated instructions belongs to the one or more predicated instructions that are associated with a first path or the one or more predicated instructions that are associated with a second path;

determining whether the predicate value is available;

in response to determining the predicate value is not available, stalling, at the renaming stage of the branch pipeline, register renaming for the plurality of predicated instructions until the predicate is resolved, wherein the predicate is resolved by executing the predicate defining instruction;

receiving an indication that predicate defining instruction has been executed; and in response to the predicate being resolved:
  receiving, at the renaming stage, the predicate value from an execution stage of the instruction pipeline, wherein the renaming stage and the execution stage are directly connected via a data path;
  performing, via the renaming stage of the out-of-order processor, an exclusive NOR function on the predicate and the stored mask;
  identifying from an output of the exclusive NOR function:
    a first one or more predicated instructions of the plurality of predicated instructions that are associated with a taken path from among the first path and the second path and are to be renamed and executed; and
    a second one or more predicated instructions of the plurality of predicated instructions that are associated with a not taken path from among the first path and the second path and are to be discarded;
  renaming the first one or more predicated instructions that are associated with the taken path by mapping logical register numbers in an instruction to physical registers; and
  executing the one or more renamed predicated instructions.

2. The method of claim 1, further comprising:
converting conditional branches into the predicate defining instructions; and
assigning instruction streams along alternate paths as the predicated instructions, wherein the alternate paths comprise the taken path and the not taken path;
wherein the predicate is based on a condition register value.

3. The method of claim 1,
wherein the plurality of predicated instructions are decoded in parallel.

4. The method of claim 1, wherein the method of handling predicated code in an out-of-order processor is embodied on one or more non-transitory computer-readable storage mediums comprising program code for execution on a data processing system.

5. The method of claim 1, further comprising:
scanning a plurality of fetched instructions for branches; and
in response to detecting a branch in the plurality of fetched instructions, predicting a branch direction of the branch from among the plurality of predicated instructions using three branch history tables (BHTs) comprising: a first BHT that uses bimodal branch prediction to predict the branch direction, a second BHT that uses path-correlated branch prediction to predict the branch direction, and a third BHT that is configured to predict which of the first BHT and the second BHT is more likely to correctly predict the branch direction.

6. The method of claim 1, wherein renaming comprises:
tracking an availability of a result operand of a producer instruction;
specifying a unique physical location from which to obtain the result operand;
assigning unique physical locations to each result register generated by producer instructions;
wherein the renaming stage is further configured to convert one or more predicated instructions that are associated with the not taken path to nop instructions that do not alter architectural state upon resolution of the predicate.

7. The method of claim 1, wherein the instruction set architecture of the out-of-order processor further comprises support for processing emask instructions, wherein the plurality of predicated instructions include an emask instruction that specifies an execution mask which controls the execution of a plurality of instructions that follow the emask instruction within the plurality of predicated instructions, and wherein the plurality of instructions following the emask instruction include at least a first plurality of instructions belonging to a first path and a second plurality of instructions belonging to a second path.

8. A hardware out-of-order processor, comprising:
a processor buffer;
a decoder configured to decode a plurality of predicate defining instruction associated with a predicated code region, the predicated code region including a plurality of predicated instructions, wherein the predicate defining instruction includes an instruction that when executed sets a result including a predicate value of a predicate on which one or more subsequent instructions is predicated; and
a renaming stage of a branch pipeline configured to:
  detect the predicate defining instruction;
  in response to detecting a predicate defining instruction within the renaming stage, store a mask associated with the predicate defining instruction in a mask shift register of the renaming stage, wherein the mask indicates whether each instruction of the plurality of predicated instructions belongs to the one or more predicated instructions that are associated with a first path or the one or more predicated instructions that are associated with a second path;
  determine whether the predicate value is available;

in response to determining the predicate value is not available, stall, at the renaming stage of the branch pipeline, register renaming for the plurality of predicated instructions until the predicate is resolved, wherein the predicate is resolved by executing the predicate defining instruction; and in response to the predicate being resolved:
  receive, at the renaming stage of the branch pipeline, the predicate value from an execution stage of the branch pipeline, wherein the renaming stage and the execution stage are directly connected via a data path;
  perform, via the renaming stage of the branch pipeline, an exclusive NOR function on the predicate and the stored mask;
  identify from an output of the exclusive NOR function:
    a first one or more predicated instructions of the plurality of predicated instructions that are associated with a taken path from among the first path and the second path and are to be renamed and executed; and
    a second one or more predicated instructions of the plurality of predicated instructions that are associated with a not taken path from among the first path and the second path and are to be discarded;
  rename the first one or more predicated instructions that are associated with the taken path by mapping logical register numbers in an instruction to physical registers; and
  execute the one or more renamed predicated instructions.

9. The hardware out-of-order processor of claim 8, wherein the plurality of predicated instructions are decoded in parallel.

10. The hardware out-of-order processor of claim 8, wherein the renaming stage is further configured to:
  receive an indication that the predicate is resolved, wherein the hardware out-of-order processor comprises a plurality of pipelines comprising at least: the branch pipeline, one or more load-storage pipelines, one or more fixed-point pipelines, one or more floating point pipelines, and a condition register logical operation pipeline;
  convert conditional branches into the predicate defining instructions; and
  assign instruction streams along alternate paths as the predicated instructions, wherein the alternate paths comprise the taken path and the not taken path; and
  wherein the predicate is based on a condition register value.

11. The hardware out-of-order processor of claim 8, wherein the hardware out-of-order processor is further configured to:
  scan a plurality of fetched instructions for branches; and
  in response to detecting a branch in the plurality of fetched instructions, predict a branch direction of the branch from among the plurality of predicated instructions using three branch history tables (BHTs) comprising: a first BHT that uses bimodal branch prediction to predict the branch direction, a second BHT that uses path-correlated branch prediction to predict the branch direction, and a third BHT that is configured to predict which of the first BHT and the second BHT is more likely to correctly predict the branch direction.

12. The hardware out-of-order processor of claim 8, wherein the instruction set architecture of the hardware out-of-order processor further comprises support for processing emask instructions, wherein the plurality of predicated instructions include an emask instruction that specifies an execution mask which controls the execution of a plurality of instructions that follow the emask instruction within the plurality of predicated instructions, and wherein the plurality of instructions following the emask instruction include at least a first plurality of instructions belonging to a first path and a second plurality of instructions belonging to a second path.

13. A processor system, comprising:
  a memory subsystem; and
  a hardware out-of-order processor coupled to the memory subsystem having a processor buffer, wherein the hardware out-of-order processor comprises:
    a decoder configured to decode a predicate defining instruction associated with a predicated code region, the predicated code region including a plurality of predicated instructions, wherein the predicate defining instruction includes an instruction that when executed sets a result including a predicate value of a predicate on which one or more subsequent instructions is predicated; and
    a renaming stage of a branch pipeline configured to:
      detect the predicate defining instruction;
      in response to detecting a predicate defining instruction within the renaming stage, store a mask associated with the predicate defining instruction in a mask shift register wherein the mask indicates whether each instruction of the plurality of predicated instructions belongs to the one or more predicated instructions that are associated with a first path or the one or more predicated instructions that are associated with a second path;
      determine whether the predicate value is available;
      in response to determining the predicate value is not available, stall, at the renaming stage of the branch pipeline, register renaming for the plurality of predicated instructions until the predicate is resolved, wherein the predicate is resolved by executing the predicate defining instruction; and
      in response to determining the predicate being resolved:
        receive, at the renaming stage of the branch pipeline, the predicate value from an execution stage of the branch pipeline at the renaming stage of the branch pipeline, wherein the renaming stage and the execution stage are directly connected via a data path;
        perform, via the renaming stage of the out-of-order processor, an exclusive NOR function on the predicate and the stored mask;
        identify from an output of the exclusive NOR function:
          a first one or more predicated instructions of the plurality of predicated instructions that are associated with a taken path from among the first path and the second path and are to be renamed and executed; and
          a second one or more predicated instructions of the plurality of predicated instructions that are associated with a not taken path from among the first path and the second path and are to be discarded;

rename the first one or more predicated instructions that are associated with the taken path by mapping logical register numbers in an instruction to physical registers; and execute the one or more renamed predicated instructions.

14. The processor system of claim 13, wherein the renaming stage is further configured to:

convert the second one or more predicated instructions that are associated with the not taken path to one or more no-operation (nop) instructions, wherein the nop instructions do not alter the architectural state of the hardware out-of-order processor; and wherein the plurality of predicated instructions are decoded in parallel, and wherein the hardware out-of-order processor comprises a plurality of pipelines comprising at least: the branch pipeline, one or more load-storage pipelines, one or more fixed-point pipelines, one or more floating point pipelines, and a condition register logical operation pipeline.

15. The processor system of claim 13, wherein the hardware out-of-order processor is further configured to:

scan a plurality of fetched instructions for branches; and in response to detecting a branch in the plurality of fetched instructions, predict a branch direction of the branch from among the plurality of predicated instructions using three branch history tables (BHTs) comprising: a first BHT that uses bimodal branch prediction to predict the branch direction, a second BHT that uses path-correlated branch prediction to predict the branch direction, and a third BHT that is configured to predict which of the first BHT and the second BHT is more likely to correctly predict the branch direction.

16. The processor system of claim 13, wherein the instruction set architecture of the hardware out-of-order processor further comprises support for processing emask instructions, wherein the plurality of predicated instructions include an emask instruction that specifies an execution mask which controls the execution of a plurality of instructions that follow the emask instruction within the plurality of predicated instructions, and wherein the plurality of instructions following the emask instruction include at least a first plurality of instructions belonging to a first path and a second plurality of instructions belonging to a second path.

* * * * *